J. G. LYDECKER.
LATCH DEVICE FOR HOLDING AUTOMOBILE AND OTHER DOORS IN VENTILATING POSITION.
APPLICATION FILED JULY 28, 1914.
1,151,889.
Patented Aug. 31, 1915.
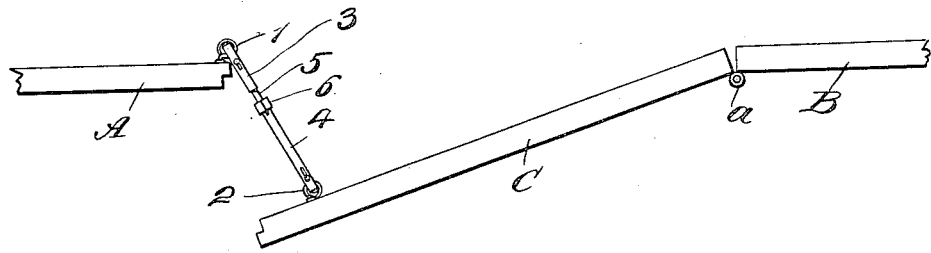
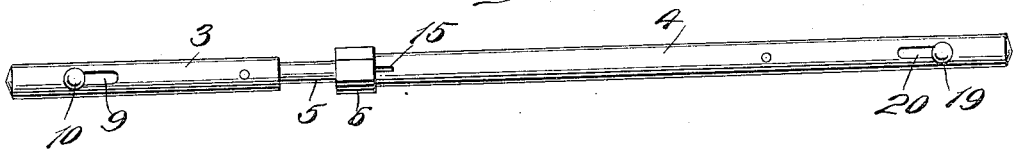
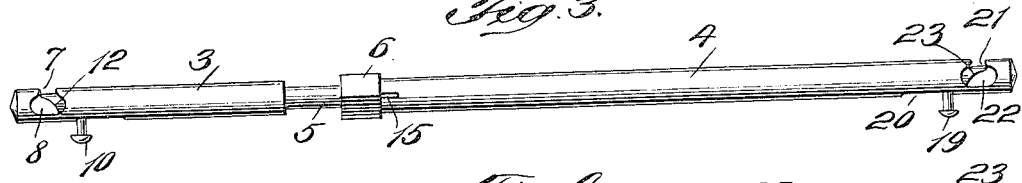
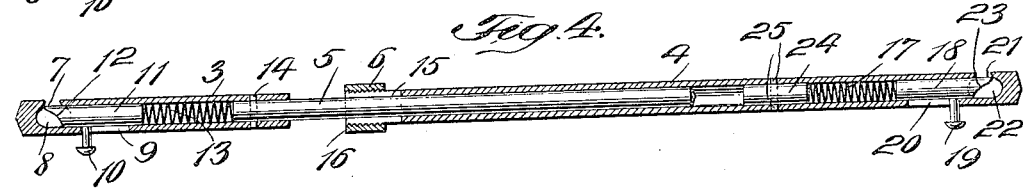

UNITED STATES PATENT OFFICE.

JOHN GEORGE LYDECKER, OF NEW YORK, N. Y.

LATCH DEVICE FOR HOLDING AUTOMOBILE AND OTHER DOORS IN VENTILATING POSITION.

1,151,889. Specification of Letters Patent. Patented Aug. 31, 1915.

Application filed July 28, 1914. Serial No. 853,632.

*To all whom it may concern:*

Be it known that I, JOHN GEORGE LYDECKER, a citizen of the United States, residing at New York, in the county of New York and State of New York, have invented certain new and useful Improvements in Latch Devices for Holding Automobile and other Doors in Ventilating Position, of which the following is a specification, reference being had therein to the accompanying drawing.

This invention relates to a latch device for holding automobile and other doors in ventilating position, the object being to provide a simple and effective device for preventing the over-heating of automobiles and similar vehicles, particularly in summer weather.

The invention consists essentially in a device for holding the side door of the car frame in an open position, the opening being greater or less, as desired, so that a current of air may be allowed to circulate into and through the car, due to the rapid motion of the car through the air, and such circulation having the function tending to counteract the heat derived from the motor as well as that from the hot atmosphere, and, hence, causing a considerable reduction in the temperature of the interior of the car where the occupants are sitting.

The invention, therefore, consists essentially in the construction, arrangement and combination of parts, substantially as will be hereinafter described and claimed.

In the accompanying drawing illustrating my invention, Figure 1 is a plan view of an automobile door and a portion of the side of the car, said door being held in an open position by means of my improved device. Fig. 2 is an enlarged detail plan view of the device. Fig. 3 is a side view of the same. Fig. 4 is a longitudinal section.

Similar characters of reference designate corresponding parts throughout the different figures of the drawing.

For purposes of illustration, A denotes the side of an automobile adjoining the door C, which latter is hinged at *a* to another portion B of the vehicle body or frame. The door C swings toward and away from the side A. In order to create a current of air from the outside atmosphere through the interior of the body and thus produce a cooling effect, it is desirable to hold this door more or less ajar, and this is accomplished by the latch device which constitutes my present improvement, it being, of course, necessary that the door C should be firmly and rigidly held in its open position.

The latch device comprises two rods, 3 and 4, which are fastened securely together, and which rods are connected to the screw-eyes 1 and 2, screw-eye 1 being fastened to the side A of the car, and screw-eye 2 being fastened to the inside of the door C. The rods 3 and 4 are preferably of hollow form and are adjustably connected together so that the device may be lengthened or shortened. A rod 5 is secured in the end of the tubular rod 3 by means of a pin 14, and this rod 5 enters the tubular rod 4 and is adjustable therein. The end of the rod 4 nearest the rod 3 is provided with one or more slits at 15, and also has a screw thread 16 thereon, which is slightly conical and which is engaged by a nut 6. The screwing or the unscrewing of the nut 6 tightens or loosens the compressible slit end of the rod 4 and thereby clamps said end upon the rod 5 or releases it therefrom. Therefore, by a proper manipulation of the nut 6 and of the aforesaid parts, the device can be lengthened or shortened, the length of the connecting rod 5 permitting this, as I have explained. Of course, it will be obvious that a single rod can be employed, if desired, but such a rod if not provided with an extensible feature would only permit the door to be opened for a specific predetermined distance and would allow no variation, and it is generally desirable to have the device so constructed that the door may be opened for a greater or less extent within narrow limits; ordinarily, perhaps, a distance of from four to six inches will be sufficient.

As already stated, one end of the device, that is to say, the tubular rod 3, engages the screw-eye 1 on the vehicle side A, while the other part of the device, the tubular rod 4, engages the screw-eye 2 on the swinging door C. The engagement in each case must be positive and rigid so that there will be no swinging, rattling, or chucking of the door. To do this, I provide the tubular rod 3 and also the tubular rod 4 each with a spring catch. Inside the rod 3 is a pin 11 having a curved end 12 which operates in connection with the curved end 8 of the interior of the rod and the adjacent slot 7 in the rod, through which the screw-eye passes. The pin 11 is urged toward the curved end 8 by a spring 13 interposed between the end of the pin 11 and the end of the fixed connecting rod 5. Furthermore, the sliding pin 11 is provided with a lateral projecting pin 10 working through a slot 9 in the side of the rod 3. By laying hold of the pin 9, the catch pin 11 can be moved away from the slot 7 and thus the screw-eye released. So much for the sliding catch in the tubular rod 3. A similar sliding catch is arranged in the end of the other rod 4. This latter catch consists of a movable pin 18, having a curved end 23 operating in conjunction with the curved end 22 of the interior cavity in the rod 4, there being a slot 25 cut in the side of the rod 4 contiguous to the curved end 22. The sliding pin 18 is also provided with a lateral pin 19 working in a slot 20 in the rod 4 and used for the purpose of enabling the catch 18 to be released from its contact with the screw-eye, which passes through the slot 21, and is engaged by the spring actuated locking catch 18 when the parts are in operative position. Inside the rod 4 is a spring 17 pressing against the sliding catch 18 and also bearing against an abutment within said rod, which may be formed in any desired manner, as, for instance, by means of a short section or pin 34 held in place by a cross pin 25 as shown in Fig. 4.

When the device is to be in operative position, it will be arranged as shown in Fig. 1, with the catch device 11 at one end engaging screw-eye 1, the ring of which passes through the slot 7 and is held firmly between the curved end 8 in the interior of the rod 3 and the curved end 12 of the pin 11; while at the other end of the device the spring actuated pin 18 is locking against the ring of the screw-eye 2 which passes through the slot 21, and is firmly held against the curved end 22 of the interior of the rod and the curved end 23 of the pin 18. It will be obvious at a glance that the screw-eye 2 can readily be released and the catch disengaged therefrom by pushing back the pin 18, by laying hold of the projecting pin 19, and that similarly the pin 11 can be disengaged from the screw-eye 1 by laying hold of the pin 10 and pulling the pin 11 away from the screw-eye, allowing its rings to be removed from the slot 7.

It is obvious that a great variety of changes may be made in the precise construction and arrangement of the various parts, and I reserve the liberty of modifying the same within the scope of the appended claims as much as may be necessary.

As I have already said, a single rod with a catch at both ends may be employed instead of two connecting rods which allow of an extension feature. Likewise, the shape and relative size of the various parts may vary within wide limits. Obviously, the catch device may be used at one or both ends. It can readily be omitted from one end, and the other end provided simply with a perforation to engage the screw-eye without employing the catch at more than one end.

Having thus described my invention, what I claim as new and desire to secure by Letters Patent, is:—

1. A latch device for holding a door in open position to promote the circulation of air and produce a cooling effect, consisting essentially in the combination of a hinged door and a frame, of a ring in the door and a ring in the frame, and a connecting device slotted and having an internal yielding catch at one or both ends for engaging the rings.

2. A device for holding a door in an open position to promote circulation of air, consisting in the combination with a door and a frame or body, of a rod composed of sections engaging each other so that the device is extensible, the end of each section provided with an internal latch adapted to make a positive engagement with a ring or screw-eye in the door and side of the body.

3. The combination with a door and the side of the frame, each provided with a screw-eye, of a latch device carrying at each end an internal catch, each end being slotted to receive the ring or screw-eye so that it will be positively engaged by said internal catch and firmly locked so as to keep the door in rigid and open position.

4. The combination with a door and the side of the frame, of a screw-eye in each part, and a latch device connecting the screw-eyes, composed of a tubular rod, a spring actuated sliding pin in one or both ends of said rod, said pin having a projecting pin working through a slot and used for the purpose of releasing it, there being slots in the rod for receiving the ring portions of the screw-eyes so that they may be securely locked by the sliding pins.

5. The combination with a door and the side of the frame, of means for holding the door in open position, composed of a tubular rod, having in the end a cross slot and a curved interior wall, and a spring actuated pin having a curved end and located within the tubular rod so that it will engage means on the door passing through the slot, together with means for actuating said sliding pin from the outside of the tubular rod.

In testimony whereof I affix my signature in the presence of two witnesses.

JOHN GEORGE LYDECKER.

Witnesses:
ELMER J. AUSTIN,
E. M. BRYMAN.

Copies of this patent may be obtained for five cents each, by addressing the "Commissioner of Patents, Washington, D. C."